United States Patent [19]

Cann et al.

[11] Patent Number: 5,548,040
[45] Date of Patent: Aug. 20, 1996

[54] PROCESS FOR PASSIVATION OF A REACTOR AFTER SHUTDOWN OF ALPHA OLEFIN POLYMERIZATION PROCESSES

[75] Inventors: Kevin J. Cann, Rocky Hill, N.J.; Fathi D. Hussein, Cross Lanes, W. Va.; Daniel P. Zilker, Jr., Charleston, W. Va.; Kiu H. Lee, South Charleston, W. Va.

[73] Assignee: Union Carbide Chemicals & Plastics Technology Corporation, Danbury, Conn.

[21] Appl. No.: 359,513

[22] Filed: Dec. 20, 1994

[51] Int. Cl.$^6$ ........................................ C08F 2/34
[52] U.S. Cl. ........................................ 526/62
[58] Field of Search ........................................ 526/62

[56] References Cited

U.S. PATENT DOCUMENTS

| | | | |
|---|---|---|---|
| 3,050,514 | 8/1962 | Cawthon et al. | 260/94.9 |
| 4,003,712 | 1/1977 | Miller | 23/288 S |
| 4,166,167 | 8/1979 | Bye et al. | 526/142 |
| 4,224,424 | 9/1980 | Bauman | 526/62 |
| 4,262,109 | 4/1981 | Englin et al. | 526/62 |
| 4,376,191 | 3/1983 | Geck | 526/102 |
| 4,467,080 | 8/1984 | Brun et al. | 526/62 |
| 4,564,660 | 1/1986 | Williams et al. | 526/106 |
| 4,721,763 | 1/1988 | Bailly et al. | 526/88 |
| 5,432,236 | 7/1995 | Sano et al. | 526/88 |

FOREIGN PATENT DOCUMENTS

| | | |
|---|---|---|
| 0099774 | 2/1984 | European Pat. Off. . |
| 0099660 | 2/1984 | European Pat. Off. . |
| 2047105 | 2/1990 | Japan . |
| 1082038 | 9/1967 | United Kingdom . |

OTHER PUBLICATIONS

Malpass, D. B., Texas Alkyls, Inc. unpublished data, *Organometallics*.

*Primary Examiner*—Thomas R. Weber
*Attorney, Agent, or Firm*—B. L. Deppenbrock

[57] ABSTRACT

A method for passivating internal surfaces of a reactor system during start-up and shutdown of an alpha olefin polymerization or copolymerization reaction by adding a passivation agent such as a dialkyl zinc compound, an alcohol, or an epoxide, to the reactor prior to exposing the internal reactor surfaces to air or moisture before reaction initiation and/or after reaction ceases.

10 Claims, No Drawings

PROCESS FOR PASSIVATION OF A REACTOR AFTER SHUTDOWN OF ALPHA OLEFIN POLYMERIZATION PROCESSES

FIELD OF THE INVENTION

This invention relates to processes for preparing polymers of ethylene and at least one $C_3$ to $C_{12}$ alpha olefin, particularly ethylene/propylene rubbers (EPRs) which include ethylene/propylene copolymers (EPMs) and ethylene/propylene/diene terpolymers (EPDMs). More particularly, the invention relates to a process for passivation of a reactor during start-up and shutdown of alpha olefin polymerization processes.

BACKGROUND OF THE INVENTION

From time to time during the production of ethylene homopolymers and copolymers, including EPMs and EPDMs, it is necessary to shutdown the polymerization reactor for periodic maintenance and cleaning. During shutdown and start-up the inside of the reactor is exposed to air and moisture. Exposure of the internal surfaces of the carbon steel reactor to air and moisture can result in surface corrosion due to one or more of the catalyst components (precursor transition metal compound, co-catalyst, and/or promoter) reacting with the air or moisture. Exposed surfaces of other carbon steel equipment used along with the reactor such as recycle lines and elbows, compressor impeller, recycle valve, distribution caps, and coupons can likewise be affected.

Exposure to air and moisture is particularly a problem during the production of EPMs and EPDMs in which an alkylaluminum or alkylaluminum halide is employed as co-catalyst in conjunction with a vanadium catalyst and a halocarbon promoter. During polymerization, the alkylaluminum or alkylaluminum halide is chlorinated as the result of reacting with the halocarbon promoter. This results in the formation of aluminum compounds with a Cl/Al ratio greater than one. These chlorinated and polychlorinated species are a source of reactor corrosion when the reactor is exposed to air and moisture. Upon exposure to air and moisture the chlorinated aluminum species immediately hydrolyze to produce inert alumina and hydrochloric acid. Hydrochloric acid in the presence of air or moisture corrodes the metal surfaces of the reactor.

The industry has attempted to solve the problem of corrosion of the internal reactor surfaces by painting or coating them with polymers or anti-corrosion paints to extend the lifetime of the reactor. Painting is costly and time consuming and chips of the paint or coating can form flakes which can fall into the reactor during polymerization. Accordingly, there is a need for another method of eliminating or reducing corrosion of internal reactor surfaces.

SUMMARY OF THE INVENTION

The present invention provides a method for the passivation of internal reactor surfaces prior to commencing or after terminating a polymerization process of ethylene and at least one alpha olefin having 3 to 12 carbon atoms, hydrogen, and optionally a diene in the presence of a catalyst system comprising (i) a vanadium compound, (ii) an alkylaluminum or alkylaluminum halide co-catalyst and optionally (iii) a halocarbon promoter, which method comprises: prior to exposing the internal reactor surfaces to air or moisture (A) introducing a dialkylzinc compound having 1 to 12 carbon atoms to a reactor before commencing polymerization; or (B) adding a passivation agent selected from the group consisting of (a) a dialkylzinc compound having 1 to 12 carbon atoms, (b) an alcohol having 1 to 10 carbon atoms, and (c) an epoxide having 1 to 8 carbon atoms after terminating polymerization.

DETAILED DESCRIPTION OF THE INVENTION

Passivation Agents

In the present invention, corrosion of internal reactor surfaces, such as reactor walls, distribution plate, compressor impeller and the recycle line, is eliminated or reduced by contacting those surfaces with a passivation agent. Passivation is the process of making the internal surfaces of the polymerization vessel or reactor inactive and/or nonactive to prevent corrosion of the internal surfaces when air or moisture is present. Passivation can be accomplished before polymerization is commenced or initiated, after polymerization is terminated, or as part of an emergency shutdown procedure. Passivation performed before the polymerization reaction is initiated can be referred to as pre-reaction passivation during startup, or it can be performed after the polymerization reaction is terminated and is referred to as post-reaction passivation. When passivation is performed before the polymerization is commenced or initiated, a dialkylzinc compound is employed. When passivation is practiced after the polymerization reaction is terminated, the passivation agent can be a dialkyl zinc compound, an alcohol or an epoxide. It is understood that both pre-reaction and post reaction passivation may be practiced in conjunction with the startup and shutdown of the same polymerization reaction though usually one or the other is all that is necessary. The passivation agent is selected from the group consisting of an dialkyl zinc compound having 1 to 12 carbon atoms, an alcohol having 1 to 10 carbon atoms, an epoxide having 1 to 8 carbon atoms, and mixtures thereof.

Dialkyl zinc passivation agents for use before the polymerization reaction is initiated and after polymerization reaction has been terminated have the formula $R_2Zn$ wherein each R is independently an alkyl group having 1 to 12 carbon atoms, preferably 1 to 6 carbon atoms. Illustrative dialkyl zinc passivation agents can include, for example, dimethyl zinc, diethyl zinc, diisobutyl zinc, dipropyl zinc, di-n-butyl zinc, ethyl butyl zinc, di-n-hexyl zinc, di-n-octyl zinc. Preferred alkyl zinc compounds are dimethyl zinc and diethyl zinc. Diethyl zinc is most preferred.

Illustrative alcohols (ROH) which are employed in the invention include linear and branched alcohols and can include, for example, methanol, ethanol, propanol, isopropanol, n-, sec-, and tert-butanol. Preferred among these alcohols are methanol, ethanol and isopropyl alcohol. Methanol and ethanol are most preferred.

Illustrative epoxides employed in the present invention can include linear and branched, saturated and unsaturated, substituted and unsubstituted epoxides. These can include, for example, ethylene oxide, propylene oxide and epoxide derivatives made from butene, hexene, cyclohexene and high molecular weight alpha-olefins ($C_7$ to $C_{20}$). Preferred epoxides are ethylene oxide and propylene oxide. Of these, propylene oxide is the most preferred.

The manner in which the passivation agent is introduced into the reactor is not critical. In general, the passivation reagent can be injected or sprayed into the reactor using conventional means. The agent can be added neat or dissolved in a solvent which is nonreactive with the passivation agent as well as the catalyst and reactants present in the reactor during polymerization. Hydrocarbons such as isopentane, hexane, heptane, toluene, xylene and naptha are preferred. Generally, such solutions contain from 1 weight percent to 99 weight percent of the agent, usually from 2 weight percent to 25 weight percent of such passivation agent.

For pre-reaction passivation enough of a pre-reaction passivation agent of a dialkyl zinc compound such as diethyl zinc (DEZ) is used to equal about 500 to 2000 ppm based on the reactor bed weight. In pre-reaction passivation, the dialkyl zinc compound is preferably added to the reactor prior to commencement of polymerization and the reactor containing such dialkyl zinc compound is subjected to a pressure of from 150 psi to 600 psi (1.0 to 4.1 MPa) and a temperature of from 30° C. to 90° C. for at least 1 to 10 hours, preferably 3 to 6 hours.

The amount of post-reaction passivation agent employed in process of the invention is not critical, and, in general, is an amount in excess of a stoichiometric amount based upon the amount of co-catalyst employed. Preferably the amount of passivation reagent ranges from about one to ten molar equivalents based upon the amount co-catalyst employed in the polymerization. Most preferably the amount of the passivation agent to co-catalyst in molar equivalents is about 2 to 1. Alternatively, the amount of post-reaction passivation agent can preferably be based upon the original or initial reactor bed weight just prior to discharging the bed, and generally is about 250 to 10,000 ppm.

In the commercial production of EPR and EPDM, an alkylaluminum halide such as triethylaluminum or diethylaluminum chloride is employed as a co-catalyst in conjunction with a vanadium catalyst such as vanadium acetylacetonate and a halocarbon promoter such as ethyl trichloroacetate or perchloropropylene. During polymerization it is believed that the co-catalyst is chlorinated from reaction with the promoter in accordance with the following reaction equations:

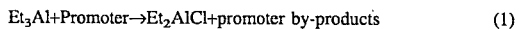
$$Et_3Al + Promoter \rightarrow Et_2AlCl + promoter\ by\text{-}products \quad (1)$$

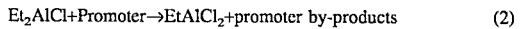
$$Et_2AlCl + Promoter \rightarrow EtAlCl_2 + promoter\ by\text{-}products \quad (2)$$

In the equations, Et is an ethyl group, $C_2H_5$. It is theorized that these chlorinated species become a source of reactor corrosion when the reactor is exposed to air and moisture such as during start-up and shutdown in accordance with the following reaction equation:

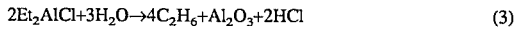
$$2Et_2AlCl + 3H_2O \rightarrow 4C_2H_6 + Al_2O_3 + 2HCl \quad (3)$$

Water may be present on the internal reactor surface during startup.

Further, it is theorized that an dialkyl zinc compound such as diethyl zinc forms a complex with the alkylaluminum halide co-catalyst and may also decompose to zinc oxide upon hydrolysis. In turn, the zinc oxide is used as an acid scavenger forming a zinc chloride which is not harmful to the carbon steel of the reactor or to an alpha olefin polymerization process or its reactants. This reaction is as follows:

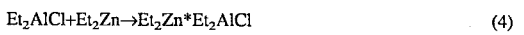
$$Et_2AlCl + Et_2Zn \rightarrow Et_2Zn \cdot Et_2AlCl \quad (4)$$

$$Et_2Zn + H_2O \rightarrow ZnO + C_2H_6 \quad (5)$$

$$ZnO + 2HCl \rightarrow ZnCl_2 + H_2O \quad (6)$$

When an alcohol is employed as the passivation agent the reaction equation is:

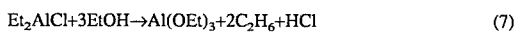
$$Et_2AlCl + 3EtOH \rightarrow Al(OEt)_3 + 2C_2H_6 + HCl \quad (7)$$

The alcohol decomposes the co-catalyst into free dry hydrochloric acid and aluminum alkoxide so under anhydrous conditions, the hydrochloric acid is not corrosive to metal and the acid can be purged from the reactor with nitrogen or other inert gases before moisture is allowed to enter.

Similarly, epoxides can be employed as passivation agents in accordance with the following reaction equations:

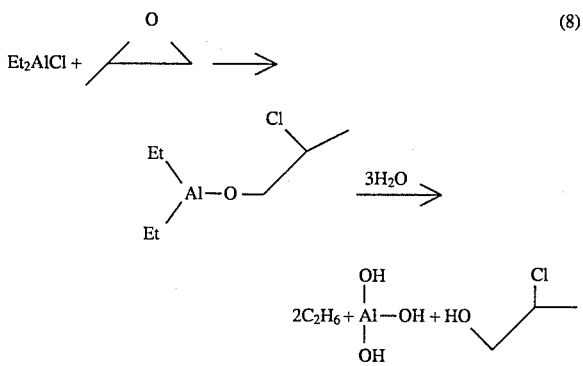

(8)

Use of Passivation Agent in Polymerization

In the present invention prior to commencing polymerization, a passivation reagent, such as DEZ, is fed to the reactor after the polymer bed is charged to the reactor. For example, an empty reactor is dried to less than 100 ppm water or moisture using heated dry nitrogen or other inert gas. The reactor is charged with polymer resin from a previous run and drying of the fluidizing bed is continued until less than 50 ppm water remains in the gas phase. A dialkyl zinc passivation agent is added either neat or as a solution in a saturated hydrocarbon such as isopentane at a rate such that the bed concentration is between 500 and 2000 ppm. The bed is fluidized between about 30° C. and 90° C. for three to six hours under nitrogen pressure. After this period, the monomers are fed to the reactor to achieve a desired concentration and optionally a fluidization aid such as carbon black is added followed by the catalyst system to begin polymerization of the monomers.

Alpha olefin polymerization processes using a fluidized bed reactor are well known and disclosed, for example, in U.S. Pat. Nos. 4,482,687 and 4,994,534. The bed is usually made up of the same granular resin that is to be produced in the reactor. Thus, during the course of the polymerization, the bed comprises formed polymer particles, growing polymer particles, and catalyst particles fluidized by polymerizing and fluidizing gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. Typical cycle gas is comprised of ethylene, nitrogen, hydrogen, and propylene, either alone or in combination. The process can be carried out in a batch or continuous mode, the latter being preferred.

In a preferred embodiment of the invention, a polymerization is conducted in the gas phase, preferably in a fluidized bed made up of particulate EPM or EPDM. The fluidized bed can be a stirred fluidized bed reactor or a fluidized bed reactor which is not stirred. In terms of the fluidized bed, a superficial velocity of about 1 to about 4.5 feet per second and preferably about 1.5 to about 3.5 feet per second can be used. The total reactor pressure can be in the range of about 150 to about 600 psi (1.0 to 4.1 MPa) and is preferably in the range of about 250 to about 500 psi (1.7 to 3.4 MPa). The ethylene partial pressure can be in the range of about 25 psi to about 350 psi (0.17 to 2.4 MPa) and is preferably in the range of about 80 psi to about 250 psi (0.5 to 1.7 MPa). The gaseous fed streams of ethylene, propylene, and hydrogen are preferably fed to the reactor recycle line while a liquid diene such as ethylidene norbornene and 1,4 hexadiene, if used, and the co-catalyst solution are fed directly to the fluidized bed reactor to enhance mixing and dispersion. The residence time of the mixture of comonomers, resin, a conventional transition metal catalyst for alpha olefin polymerization, in the fluidized bed can be in the range of about 1.5 to about 8 hours and is preferably in the ranged of about 2 to about 4 hours.

In a preferred embodiment of the invention the transition metal catalyst is a vanadium based catalyst system useful in the preparation of the EPM or EPDM product. It is comprised of (a) a vanadium compound or the reaction product of a vanadium compound and an electron donor as catalyst precursor; (b) a hydrocarbyl aluminum and/or a hydrocarbyl aluminum halide co-catalyst; and optionally, (c) a halocarbon promoter.

The vanadium compound can be any of the group of vanadium compounds well known to be useful as or in catalyst precursors in olefin polymerization processes. Examples are vanadium acetylacetonates, vanadium trihalides, vanadium tetrahalides, and vanadium oxyhalides. The halides are generally chlorides, bromides, or iodides, or mixtures thereof. More specific examples of these compounds are $VCl_3$, $VCl_4$, vanadium (acetylacetonate)$_3$, vanadyl triacetylacetonate, $VO(OC_2H_5)Cl_2$, $VOCl(OC_2H_5)_2$, $VO(OC_2H_5)_3$, and $VO(OC_4H_9)_3$.

The electron donor (ED), if used in the catalyst precursor, is an organic Lewis base, liquid at temperatures in the range of about 0° C. to about 200° C., in which the vanadium compounds are soluble.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound.

A modifier, if used, can have the formula $BX_3$ or $AlR_{(3-a)}X_a$ wherein each R is an alkyl radical having 1 to 14 carbon atoms and is the same or different; each X is chlorine, bromine, or iodine and is the same or different; and a is 0, 1 or 2. While one or more modifiers can be used, two different modifiers are preferred. Preferred modifiers include alkylaluminum mono- and dichlorides wherein each alkyl radical has 1 to 6 carbon atoms, boron trichloride, and the trialkylaluminums. A particularly preferred modifier is diethylaluminum chloride. About 0.1 to about 10 moles, and preferably about 0.2 to about 2.5 moles, of modifier are used per mole of electron donor. The molar ratio of modifier to vanadium is in the range of about 1:1 to about 10:1 and is preferably in the range of about 2:1 to about 5:1.

Promoters are an optional component of the catalyst system. Chlorinated or perchlorinated esters are suitable promoters. Examples of these esters are $Cl_3CCOOC_2H_5$; $CCl_3CCl_3CCl=CClCOOC_4H_9$; $C_6H_5CCl_2COOR$ wherein R is an alkyl radical having 1 to 8 carbon atoms; and $Cl_2C=CCl-CCl_2COOC_4H_9$.

The promoter can be a saturated aliphatic halocarbon having the formula: $C_3(X)_a(F)_b(H)_c$, wherein each X is independently chlorine, bromine, or iodine; a is an integer from 6 to 8; b and c are integers from 0 to 2; and a+b+c equals 8. Examples of these halocarbon promoters are hexachloropropane, heptachloropropane, and octachloropropane. These saturated halocarbon promoters are mentioned in U.S. Pat. No. 4,892,853. In addition, the promoter can also be an unsaturated aliphatic halocarbon such as perchloropropene or any unsaturated halocarbon having a $CX_3$ group attached to a C=C group wherein each X is independently chlorine, bromine, or iodine, or a haloalkyl substituted aromatic hydrocarbon wherein the haloalkyl substituent has at least 3 halogen atoms such as α,α,α-trichlorotoluene and trichloroxylene. Again, the halogen can be chlorine, bromine, or iodine. The number of carbon atoms in the halocarbon or the haloalkyl substituent can be 1 to 14, and the number of benzene rings in the halocarbon or the aromatic hydrocarbon can be 1 to 3, but is preferably one.

Other suitable halocarbon promoters have the following formula:

$$R_yCX_{(4-y)}$$

wherein R=hydrogen or an unsubstituted or halogen substituted alkyl radical having 1 to 6 carbon atoms;

X=a halogen; and y=0, 1, or 2.

Preferred promoters of this group include flouro-, chloro-, and bromo-substituted methane and ethane wherein there are at least two X atoms, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The hydrocarbyl aluminum co-catalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine.

Examples of hydrocarbyl aluminum compounds are as follows: triisobutylaluminum, trihexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The co-catalyst compounds can also serve as modifiers.

Where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 Angstroms and preferably at least about 200 Angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support is accomplished by mixing the precursor and silica gel in the electron donor solvent or other solvent followed by solvent removal under reduced pressure.

Where modifiers are used, they are usually dissolved in an organic solvent such as isopentane and impregnated into the support following impregnation of the vanadium compound or complex, after which the supported catalyst precursor is dried. The co-catalyst is preferably added separately neat or as a solution in an inert solvent, such as isopentane, to the prepolymerization or polymerization reaction at the same time as the flow of ethylene is initiated.

Useful molar ratios for a vanadium based catalyst system are about as follows:

|  | Broad | Preferred |
|---|---|---|
| ED:V (where ED is used) | 1:1 to 20:1 | 1:1 to 10:1 |
| modifier:V | 1:1 to 10:1 | 2:1 to 5:1 |

A preferred option is to employ a fluidization aid or inert particulate material such as carbon black, silica, talc, or clay as disclosed in U.S. Pat. No. 4,994,534. When employed the fluidization aid can be introduced continuously or intermittently into the reactor. The fluidization aid can be introduced separately or along with one or more of the other components used in the polymerization. Preferably, when a fluidization aid is employed, it is introduced alone. The amount of fluidization aid employed ranges from about 5 wt. % to 40 wt. % based upon the resin composition.

The composition of the EPM or EPDM product can be varied by changing the propylene/ethylene molar ratio in the gas phase and the diene concentration in the fluidized bed. The product is intermittently discharged from the reactor as the bed level builds up with polymerization. The production rate is controlled by adjusting the catalyst feed.

When the polymerization process is completed or when it is desired to shutdown polymerization, a passivation agent is fed to the reactor in an amount such that it is at least a stoichiometric molar excess based upon the co-catalyst concentration. For example, the polymerization reaction is stopped by discontinuing the monomer and catalyst system feeds. Optionally, a fluidization aid, such as carbon black is continued into the reactor until the polymerization reaction completely ceases. The bed is discharged from the reactor. The reactor is purged with nitrogen or other inert gas for 1 to 5 hours at 50° C. to 75° C. A passivation agent, preferably an alcohol or epoxide, is charged to the reactor and circulated throughout the system apparatus for 1 to 24 hours. The reactor is purged for an additional 2 to 6 hours with dry nitrogen before circulation is discontinued. Upon discontinuing the nitrogen, the reactor pressure is discontinued and the reactor can be opened and exposed to air.

Polymers

Solid olefin polymers which can be benefited by the present invention are preferably granular. They can include polyolefins or alpha olefins such as, for example, homopolymers of ethylene or propylene; copolymers and terpolymers of a major mole percent of ethylene and/or propylene as the main monomer(s) and a minor mole percent of at least one $C_3$ to $C_8$ alpha olefin; a sticky polymer; as well as polyvinyl chlorides; and elastomers such as polybutadiene, EPMs, and EPDMs. The preferred $C_3$ to $C_8$ alpha olefins are propylene, butene-1, pentene-1, hexene-1, 4-methylpentene-1, heptene-1, and octene-1. This description is not intended to exclude the use of this invention with alpha olefin homopolymer and copolymer resins in which ethylene is not a monomer. Examples of sticky polymers which can be benefited by the present invention include ethylene/propylene rubbers and ethylene/propylene/diene rubbers, polybutadiene and isoprene rubbers, high ethylene content propylene/ethylene block copolymers, poly(1-butene) (when produced under certain reaction conditions), very low density (low modulus) polyethylenes, i.e., ethylene butene rubbers or hexene containing terpolymers, ethylene/propylene/ethylidene norbornene and ethylene/propylene/hexadiene terpolymers of low density.

The invention is further illustrated by the following examples.

EXAMPLES

Examples Illustrating the Effects of Corrosion

Comparative Example A

A carbon steel coupon was exposed to a solution of diethylaluminum chloride (DEAC) in hexane under a dry nitrogen atmosphere. Removal of the coupon from the inert atmosphere and placement of the coupon in a steam bath resulted in severe discoloration or rusting of the coupon.

Example 1

A coupon was exposed to diethyl zinc (DEZ) as in Comparative Example A. No discoloration was apparent upon steaming.

Example 2

A coupon was exposed to diethylaluminum chloride (DEAC) as in Comparative Example A and then exposed to DEZ before steaming. Virtually no discoloration was observed upon steaming.

Example 3

A coupon was exposed to DEAC as in Comparative Example A and then exposed to isopropanol prior to steaming. Slight discoloration was observed.

Examples Illustrating Use of a Passivation Agent in a Gas Phase Reactor

Example 4: Use of a Zinc Compound (Pre-Reaction Passivation Agent)

An empty polymerization reactor is dried down to 75 ppm water with heated dry nitrogen. The reactor is charged with a polymer to form a bed. Bed fluidized drying is continued until less than 20 ppm water remains in the gas phase. DEZ is added either neat or as an isopentane solution at a rate such that the bed concentration is between 1000 and 1500 ppm. The bed is fluidized at between 40° and 80° C. for three hours under nitrogen pressure of 300 psi (2.0 MPa). After this period, monomers of ethylene and propylene are fed to the reactor to achieve the desired concentrations, a carbon black fluidization aid is added followed by the catalyst components to initiate polymerization.

Example 5

A reactor was started under conditions that produced an ethylene-propylene-diene terpolymer using a supported vanadium (acetylacetonate)$_3$ catalyst and diethylaluminum chloride/ethyltricholoracetate (DEAC/ETCA) catalyst system at 35° C. DEAC was fed to the reactor diluted in isopentane (20 wt. %) to have a concentration in the reactor of 6000–7000 ppm based on resin production. The promoter (ETCA) was also fed to the reactor diluted in isopentane (10 wt. %) to have a concentration in the reactor of about 1800 to 2200 ppm based on resin production. The reactor was operated at $C_3/C_2$ molar ratio of 2.5 and $H_2/C_2$ ratio of 0.02 to 0.03. Carbon black was fed to the reactor as a fluidization aid at a level of 15 to 20% in the resin by weight. The fluidized bed reactor was operated under the above conditions to produce an EPDM for roofing applications with about 33% to 35% $C_3$ and 2% ethylidene norbornene (ENB) for a few weeks.

Following the completion of the run and prior to reactor shutdown, all feeds (monomers, catalyst, co-catalyst and promoter) to the reactor were stopped. The bed was discharged through the product discharge system, and the reactor was purged with $N_2$ for about 1 hour. Ethanol (about 5000 ppm based on original bed weight) was injected into the reactor as a passivation agent while the system was still under $N_2$ atmosphere. After 1 hour of circulation of ethanol under $N_2$ at 60° C., the reactor was purged for a few hours with $N_2$. The reactor was opened to atmosphere for inspection and cleaning. No signs of corrosion or corrosive fumes were observed.

Example 6

The reactor was started at similar conditions as in Example 5 using the above-mentioned catalyst to produce EPDM products, except that triethylaluminum (TEAL) was used as the co-catalyst and hexachloropropene (HCP) was used for the promoter. EPDM products with Mooney viscosity in the range of 40 to 80, diene content of 2% to 5 wt. %, and $C_3$ content of 30% to 40% were produced The reactor was operated at 60° C. reaction temperature and $C_3/C_2$ of 1.0 to 1.75 and $H_2/C_2$ of 0.0003 to 0.002. Again, carbon black was used as a fluidization aid in the range of 10 wt. % to 20 wt. %. Following completion of the run after several weeks, the reaction was terminated and the bed was discharged. Again, ethanol was used as in Example 5 as the passivation agent. No signs of corrosion or corrosive fumes were observed when the reactor was opened up to the atmosphere.

Example 7

The reactor was started under similar conditions as in Example 5 using the same catalyst system to produce EPDM products. The reactor was operated at $C_3/C_2$ of 2.3 and a $H_2/C_2$ ratio of 0.025 to 0.065 to make EPDM products with 33% $C_3$ and 2% ENB and about 60 Mooney viscosity. Carbon black having about 15 wt. % to 25 wt. % in the resin was used as fluidization aid. Following the completion of the run isopropanol in the range of 1000 ppm based on the original bed weight was injected as a passivation agent. The same procedure as mentioned above was used to prepare the reactor for inspection and cleaning. No corrosion or corrosive fume was observed.

Example 8: Use of an Epoxide for Post-Reaction Passivation

Example 5 is repeated except that an epoxide, propylene oxide, is employed in place of the alcohol with noncorrosive results as expected.

Comparative Example B: Use of Water:

In this example the reactor was operated as in Example 5 to produce EPDM products. Carbon black was used as the fluidization aid. Prior to opening the reactor, water was introduced in the absence of a passivation agent. Corrosion of reactor wall and distribution plate was observed upon opening the reactor for inspection.

Comparative Example C:

In this example the reactor was operated as in Example 5 to produce EPDM products. Carbon black and silica were used as fluidization aids. The reactor was purged with $N_2$ prior to opening. No passivation agent was injected prior to opening the reactor. Severe corrosion on reactor walls, distribution plate, compressor impeller and parts of the recycle line was observed upon opening the reactor for inspection.

What is claimed is:

1. A method for the passivation of internal reactor surfaces of a fluidized bed reactor after terminating a polymerization process of ethylene and at least one alpha olefin having 3 to 12 carbon atoms, hydrogen, and optionally a diene in the presence of a catalyst system comprising (i) a vanadium compound, (ii) an alkylaluminum or alkylaluminum halide co-catalyst, and optionally (iii) a halocarbon promoter, which method comprises: adding a passivation agent selected from the group consisting of (a) a dialkylzinc compound having 1 to 12 carbon atoms, (b) an alcohol having 1 to 10 carbon atoms, and (c) an epoxide having 1 to 8 carbon atoms after terminating the polymerization.

2. The method of claim 1 wherein
   (a) the dialkyl zinc compound is selected from the group consisting of dimethyl zinc, diethyl zinc, diisobutyl zinc, di-n-butyl zinc, ethyl butyl zinc, di-n-hexyl zinc, and di-n-octyl zinc;
   (b) the alcohol is selected from the group consisting of methanol, ethanol, propanol, isopropanol, n-butanol, sec-butanol, and tert-butanol;
   (c) the epoxide is selected from the group consisting of ethylene oxide, propylene oxide and epoxide derivatives of butene, hexene, cyclohexene or a $C_7$ to $C_{20}$ alpha-olefin.

3. The method of claim 2 wherein a fluidization aid selected from the group consisting of carbon black, talc, silica, and clay is added to the polymerization reaction.

4. The method of claim 3 wherein the alpha olefin is propylene.

5. The method of claim 4 wherein the diene is selected from the group consisting of 1,4 hexadiene and ethylidene norbornene.

6. The method of claim 5 wherein the catalyst is (i) a vanadium compound or the reaction product of a vanadium compound and an electron donor as catalyst precursor; (ii) a hydrocarbyl aluminum or a hydrocarbyl aluminum halide co-catalyst; and (iii) a halocarbon promoter selected from the group consisting of (1) chlorinated or perchlorinated esters, (2) a saturated aliphatic halocarbon having the formula: $C_3(X)_a(F)_b(H)_c$, wherein each X is independently chlorine, bromine, or iodine; a is an integer from 6 to 8; b and c are integers from 0 to 2, and a+b+c equals 8, (3) an unsaturated aliphatic halocarbon, and (4) a halocarbon having the formula: $R_yCX_{(4-y)}$, wherein R is hydrogen, an alkyl radical having 1 to 6 carbon atoms, a halogen substituted alkyl radical having 1 to 6 carbon atoms; X is a halogen; and y is 0, 1, or 2.

7. The method of claim 1 wherein the amount of the passivation agent is an amount in excess of a stoichiometric amount based upon the amount of co-catalyst employed.

8. The method of claim 2 wherein the dialkyl zinc is diethyl zinc present in an amount ranging from about 500 to about 2000 ppm based upon the reactor bed weight.

9. The method of claim 2 wherein the alcohol is selected from the group consisting of methanol and ethanol in an amount ranging from about 1 to 10 molar equivalents based upon the amount of cocatalyst.

10. The method of claim 9 wherein the alcohol is ethanol in an amount of about 250 to 10,000 ppm.

* * * * *